United States Patent
Snook

(10) Patent No.: US 11,850,784 B1
(45) Date of Patent: Dec. 26, 2023

(54) EXTRUSION COATED BARRIER FILM

(71) Applicant: ADLAM Films, LLC, Shannon, MS (US)

(72) Inventor: Steve Snook, Shannon, MS (US)

(73) Assignee: ADLAM Films, LLC, Shannon, MS (US)

( * ) Notice: Subject to any disclaimer, the term of this patent is extended or adjusted under 35 U.S.C. 154(b) by 585 days.

(21) Appl. No.: 16/841,554

(22) Filed: Apr. 6, 2020

Related U.S. Application Data

(60) Provisional application No. 62/829,681, filed on Apr. 5, 2019.

(51) Int. Cl.

| | | |
|---|---|---|
| B29C 48/154 | (2019.01) | |
| B29C 48/00 | (2019.01) | |
| B29C 48/88 | (2019.01) | |
| B32B 37/18 | (2006.01) | |
| B32B 27/06 | (2006.01) | |
| B32B 27/34 | (2006.01) | |
| B29K 105/00 | (2006.01) | |
| B29L 7/00 | (2006.01) | |
| B29K 677/00 | (2006.01) | |
| B29C 48/02 | (2019.01) | |
| B29C 48/08 | (2019.01) | |
| B29C 48/14 | (2019.01) | |
| B29C 48/92 | (2019.01) | |
| B32B 27/08 | (2006.01) | |
| B32B 27/28 | (2006.01) | |
| B32B 27/30 | (2006.01) | |
| B32B 37/08 | (2006.01) | |
| B32B 37/15 | (2006.01) | |

(52) U.S. Cl.
CPC ........ *B29C 48/154* (2019.02); *B29C 48/0018* (2019.02); *B29C 48/9135* (2019.02); *B32B 27/065* (2013.01); *B32B 27/34* (2013.01); *B32B 37/182* (2013.01); *B29C 48/02* (2019.02); *B29C 48/08* (2019.02); *B29C 48/147* (2019.02); *B29C 48/914* (2019.02); *B29C 48/9155* (2019.02); *B29C 48/92* (2019.02); *B29C 2948/92561* (2019.02); *B29C 2948/92704* (2019.02); *B29C 2948/92761* (2019.02); *B29C 2948/92876* (2019.02); *B29C 2948/92904* (2019.02); *B29C 2948/92942* (2019.02); *B29K 2105/0085* (2013.01); *B29K 2677/00* (2013.01); *B29L 2007/008* (2013.01); *B32B 27/08* (2013.01); *B32B 27/285* (2013.01); *B32B 27/308* (2013.01); *B32B 37/08* (2013.01); *B32B 37/153* (2013.01); *B32B 2255/10* (2013.01); *B32B 2255/26* (2013.01); *B32B 2266/0214* (2013.01); *B32B 2270/00* (2013.01); *B32B 2307/518* (2013.01); *B32B 2307/718* (2013.01); *B32B 2307/724* (2013.01); *B32B 2307/7246* (2013.01); *B32B 2309/02* (2013.01); *B32B 2309/66* (2013.01); *B32B 2377/00* (2013.01); *B32B 2419/06* (2013.01)

(58) Field of Classification Search
CPC .............. B29C 48/154; B29C 48/9135; B29C 48/0018; B29C 48/92; B29C 48/914; B29C 48/08; B29C 48/9155; B29C 48/02; B29C 48/147; B29C 2948/92876; B29C 2948/92561; B29C 2948/92704; B29C 2948/92904; B29C 2948/92942; B29C 2948/92761; B32B 27/065; B32B 27/34; B32B 27/182
See application file for complete search history.

(56) References Cited

U.S. PATENT DOCUMENTS

| | | |
|---|---|---|
| 5,972,463 A | 10/1999 | Martin et al. |
| 7,745,545 B2 | 6/2010 | Jing et al. |
| 8,541,081 B1 * | 9/2013 | Ranganathan ........ B29C 66/112 426/123 |
| 10,130,833 B2 | 11/2018 | Angadjivand et al. |
| 10,625,493 B2 | 4/2020 | Matsubara et al. |
| 2003/0121101 A1 | 7/2003 | Corzani et al. |
| 2006/0142489 A1 | 6/2006 | Chou et al. |
| 2013/0029550 A1 | 1/2013 | Seth et al. |
| 2020/0123776 A1 | 4/2020 | Leatherman et al. |

* cited by examiner

*Primary Examiner* — Frances Tischler
(74) *Attorney, Agent, or Firm* — Law Office of J.L. Simunic; Joan L. Simunic

(57) ABSTRACT

The present development is an extrusion coated barrier film with perforated holes for breathability and a moisture vapor barrier. More specifically, the coated barrier material comprises biaxially oriented nylon film extrusion coated with a blend of an acid copolymer and at least one block copolymer material made up of rigid polyamide blocks and soft polyether blocks. The extrusion coated barrier film can be thermally laminated to expanded polystyrene (EPS) foam boards, which can be used as housewrap, roofing underlayment, or in other construction materials.

15 Claims, No Drawings

EXTRUSION COATED BARRIER FILM

CROSS-REFERENCE TO PRIOR APPLICATIONS

The present application claims priority to U.S. Patent Application 62/829,681 filed 5 Apr. 2019, which is incorporated herein in its entirety.

FIELD OF THE INVENTION

The invention relates to industrial facer materials.

BACKGROUND OF THE INVENTION

Breathable barrier materials are used in a variety of industrial applications where it is desirable to transmit moisture vapor but avoid gross air or liquid transport. In building construction, such materials are used as housewraps to insulate houses and other buildings from air drafts and protect wooden and drywall substructure from liquid water. DuPont's Tyvek is an example of a commercially available breathable barrier material. High density polyethylene, microporous membranes of polypropylene or polyethylene, nonwoven polypropylene, and perforated polymer films have all been used as housewraps.

It is known that polyamides, including nylon, have significant moisture permeability. However, it is commonly known that nylon films are not suitable for processing using an extrusion coating process, particularly when using dissimilar polymers for the coating. Thus, it would be beneficial to identify a polymer blend compatible with nylon film that can be extrusion coated and that can be thermally laminated to expanded polystyrene (EPS) foam boards to produce a breathable industrial facer.

SUMMARY OF THE PRESENT INVENTION

The present development is an extrusion coated barrier film. More specifically, the coated barrier material comprises biax nylon film extrusion coated with a blend of acid copolymer and block copolymers made up of rigid polyamide blocks and soft polyether blocks. Within the industry, this may be referred to as a "breathable industrial facer". The extrusion coated barrier film can be thermally laminated to expanded polystyrene (EPS) foam boards.

BRIEF DESCRIPTION OF THE FIGURES

There are no figures in the application.

DETAILED DESCRIPTION OF THE PRESENT DEVELOPMENT

The following description is intended to provide the reader with a better understanding of the invention. The description is not intended to be limiting with respect to any element not otherwise limited within the text.

The barrier film of the present invention is made by extrusion coating a polymer blend onto a nylon film. The nylon film is preferably a biaxially oriented nylon film ("biax"). More preferably, the nylon film is a 30- to 60-gauge biax film. More preferably, the nylon film is a 48-gauge biax film.

The polymer blend comprises an extrusion-processed blend comprising an acid copolymer and block copolymers. The copolymers comprise rigid polyamide blocks and soft polyether blocks. Exemplary copolymers are ethylene-methylacrylate copolymers, sold under the tradename EMAC® by Westlake Chemical Co. of Houston, Tex., and in particular EMAC® SP 2207, EMAC® SP 2403, EMAC® SP 2268 and EMAC® SP2409. Exemplary polyether block polyamide elastomers include those sold under the trade name Pebax® by Arkema Inc. of Philadelphia Pa., such as Pebax® MH 1567, Pebax® MV 1074 and Pebax® MV 3000.

The polymer coating is produced by extrusion processing. The extrusion process allows for control of the rate of reaction by changes in the process parameters, including the extruder temperatures, melt temperature, residence time of polymers in the extruder, nip pressure, polymer blend ratios and coating weight thickness. To produce the coating, the polymer blend reactants are fed into the extruder where the material is heated and sheared to properly blend and melt the two resins. The material is then conveyed through the extruder at a rate such that the materials have a residence time in the extruder of from about one minute to about three minutes and more preferably about 1.75 minutes to about 2.75 minutes. The molten polymer is then forced from the extruder through a slit or die at from about 289° C. to about 320° C., and more preferably at from about 296.8° C. to about 312.0° C. The molten polymer is directly applied to the barrier film along with a layer of ozone. The coated barrier film is then nipped between a chill roll and rubber roll to achieve the required lamination bond strength.

The resulting coated barrier film has a water vapor transmission rate of greater than about 13 g/(100 in$^2$·day·in Hg), expressed as US PERMS. In a preferred embodiment, the coated barrier film has a water vapor transmission rate of from about 13 g/(100 in$^2$·day·in Hg) to about 16.1 g/(100 in$^2$·day·in Hg). For example:

| SAMPLE | US PERMS g/(100 in$^2$ · day · in Hg) |
|---|---|
| Control Sample (48 gauge polypropylene extrusion coated with 0.4 mil of resin) | 0.633 |
| Inventive Sample (nylon extrusion coated with 0.4 mil of Pebax ®/EMAC ® blend) | 13.8 |

The weight of the coated barrier film may be in the range of from about 22.19 grams per square meter to about 24.53 grams per square meter, and more preferably from about 22.78 grams per square meter to about 23.94 grams per square meter. The weight of the nylon film may be in the range of from about 13.22 grams per square meter to about 14.62 grams per square meter, and more preferably from about 13.88 grams per square meter to about 14.27 grams per square meter.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The invention claimed is:

1. A barrier film comprising a biaxially oriented nylon film extrusion coated with a polymer blend consisting essentially of ethylene-methylacrylate copolymer and at least one block copolymer, wherein the at least one block copolymer comprises rigid polyamide blocks and soft polyether blocks.

2. The barrier film of claim 1 wherein the nylon film is a 30-gauge to 60-gauge biaxially oriented film.

3. The nylon film of claim 2 wherein the nylon film has a weight of from about 13.22 grams per square meter to about 14.62 grams per square meter.

4. The nylon film of claim 3 wherein the nylon film has a weight of from about 13.88 grams per square meter to about 14.27 grams per square meter.

5. The barrier film of claim 1 wherein the barrier film has a water vapor transmission rate of greater than about 13 g/(100 in$^2$·day·in Hg).

6. The barrier film of claim 5 wherein the barrier film has a water vapor transmission rate of from about 13 g/(100 in$^2$·day·in Hg) to about 16.1 g/(100 in$^2$·day·in Hg).

7. The barrier film of claim 1 wherein the barrier film has a weight of from about 22.19 grams per square meter to about 24.53 grams per square meter.

8. The barrier film of claim 7 wherein the barrier film has a weight of from about 22.78 grams per square meter to about 23.94 grams per square meter.

9. The barrier film of claim 1 wherein the nylon film is extrusion coated by the steps comprising:
   a) feeding the ethylene-methylacrylate copolymer and the at least one block copolymer into an extruder where the copolymers are heated and sheared to blend and melt the resins and form a molten polymer, and wherein the copolymer blend has a residence time in the extruder of from about one minute to about three minutes;
   b) forcing the molten polymer from the extruder through a slit or die set at a temperature of from about 289° C. to about 320° C.;
   c) applying the molten polymer directly to the nylon film along with a layer of ozone;
   d) allowing the coated nylon film to be nipped between a chill roll and a rubber roll to achieve a predetermined lamination bond strength.

10. A method of using the barrier film of claim 1 wherein the extrusion coated barrier film is thermally laminated to expanded polystyrene foam boards.

11. A barrier film comprising a biaxially oriented nylon film extrusion coated with a polymer blend, wherein the polymer blend consists of (a) an ethylene-methylacrylate copolymer, and (b) a block copolymer comprising rigid polyamide blocks and soft polyether blocks.

12. The barrier film of claim 11 wherein the nylon film is a 30-gauge to 60-gauge biaxially oriented film.

13. The nylon film of claim 11 wherein the nylon film has a weight of from about 13.22 grams per square meter to about 14.62 grams per square meter.

14. The barrier film of claim 11 wherein the barrier film has a water vapor transmission rate of greater than about 13 g/(100 in$^2$·day·in Hg).

15. The barrier film of claim 11 wherein the barrier film has a weight of from about 22.19 grams per square meter to about 24.53 grams per square meter.

\* \* \* \* \*